(12) United States Patent
Tabuchi et al.

(10) Patent No.: US 11,308,599 B2
(45) Date of Patent: Apr. 19, 2022

(54) METHOD FOR PROCESSING INFORMATION, INFORMATION PROCESSOR, AND INFORMATION PROCESSING PROGRAM

(71) Applicant: Mizuno Corporation, Osaka (JP)

(72) Inventors: Noriyuki Tabuchi, Osaka (JP); Kouji Ito, Osaka (JP); Shin Hirai, Osaka (JP); Yuki Yamada, Osaka (JP)

(73) Assignee: Mizuno Corporation, Osaka (JP)

( * ) Notice: Subject to any disclaimer, the term of this patent is extended or adjusted under 35 U.S.C. 154(b) by 2 days.

(21) Appl. No.: 16/830,504

(22) Filed: Mar. 26, 2020

(65) Prior Publication Data

US 2020/0311905 A1   Oct. 1, 2020

(30) Foreign Application Priority Data

Mar. 28, 2019   (JP) .............................. JP2019-063078

(51) Int. Cl.
*G06T 7/00*    (2017.01)
*G06T 7/90*    (2017.01)
*G06T 7/70*    (2017.01)
*G06T 7/60*    (2017.01)

(52) U.S. Cl.
CPC .............. *G06T 7/0002* (2013.01); *G06T 7/60* (2013.01); *G06T 7/70* (2017.01); *G06T 7/90* (2017.01); *G06T 2207/10024* (2013.01)

(58) Field of Classification Search
CPC ........... G06T 7/0002; G06T 7/90; G06T 7/70; G06T 7/60; G06T 2207/10024; G06T 7/73; G06T 7/0004
See application file for complete search history.

(56) References Cited

U.S. PATENT DOCUMENTS

| 2010/0299616 A1* | 11/2010 | Chen ................. G06Q 30/0601 715/753 |
| 2014/0148931 A1 | 5/2014 | Watanabe et al. |
| 2016/0296813 A1* | 10/2016 | Brandt .................. A63B 60/42 |
| 2018/0089617 A1* | 3/2018 | Mattingly ............ G06Q 10/087 |
| 2019/0332866 A1* | 10/2019 | Beall .................... H04N 21/854 |

FOREIGN PATENT DOCUMENTS

WO     2013129606 A1    9/2013

* cited by examiner

*Primary Examiner* — Qian Yang
(74) *Attorney, Agent, or Firm* — Troutman Pepper Hamilton Sanders LLP; James E. Schutz; Micah B. Hensley

(57) ABSTRACT

Provided is processing of allowing an information processor to output characteristic information on at least either sports equipment or a method for using the sports equipment by a user, the information processor executing: image acquisition processing acquiring an image of the sports equipment after use, of the sports equipment with a mark attached, or of an installed tool installed, during use of the sports equipment, on the sports equipment; position identification processing identifying a position likely to be damaged of the sports equipment by performing detection of a color change place, a shape change place, or the mark on the image acquired in the image acquisition processing; and information outputting processing outputting the characteristic information based on the position identified in the position identification processing.

6 Claims, 17 Drawing Sheets

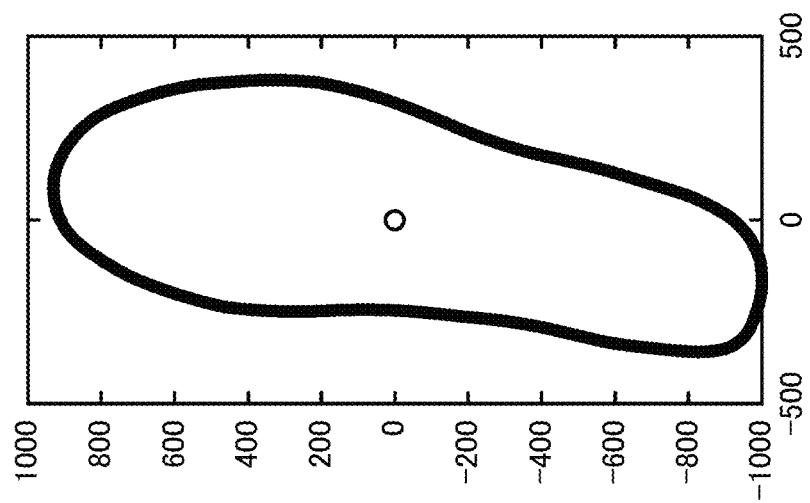
FIG.6B
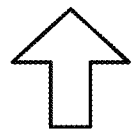
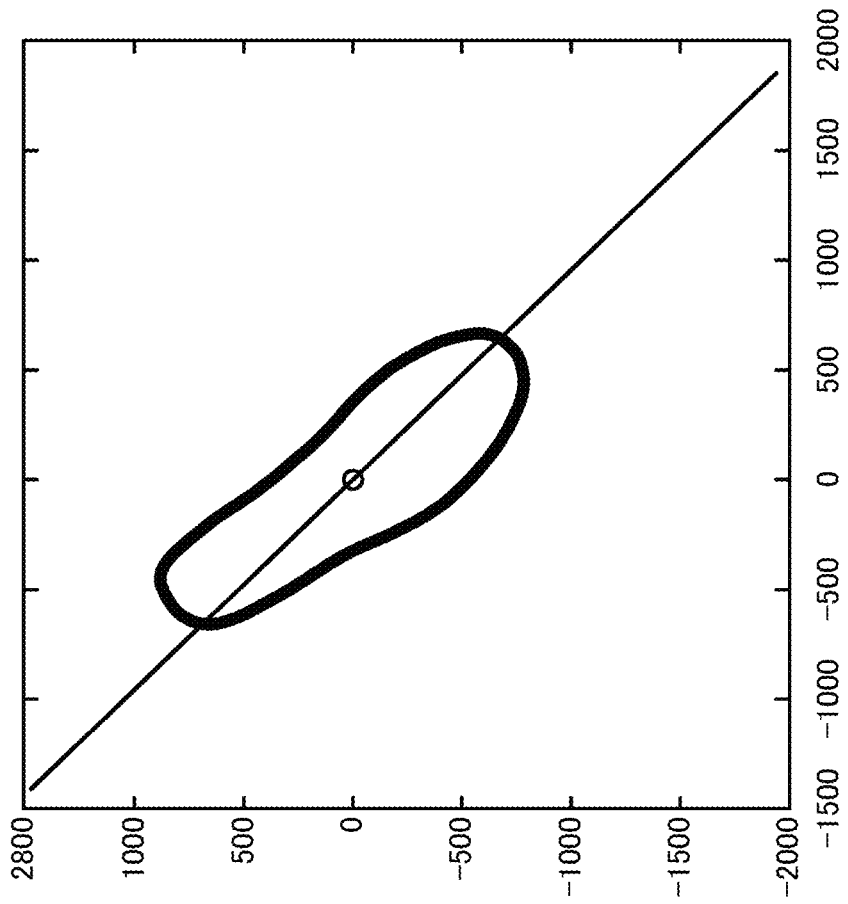
FIG.6A

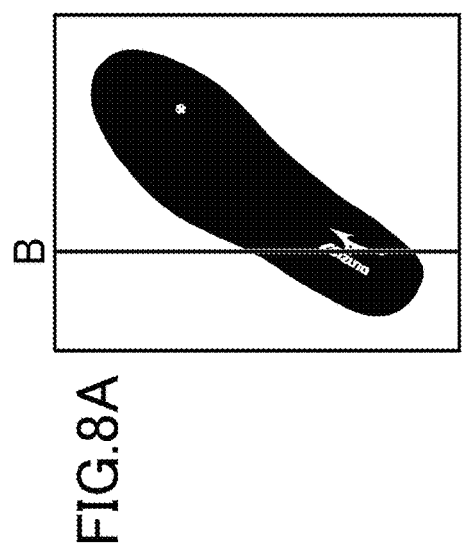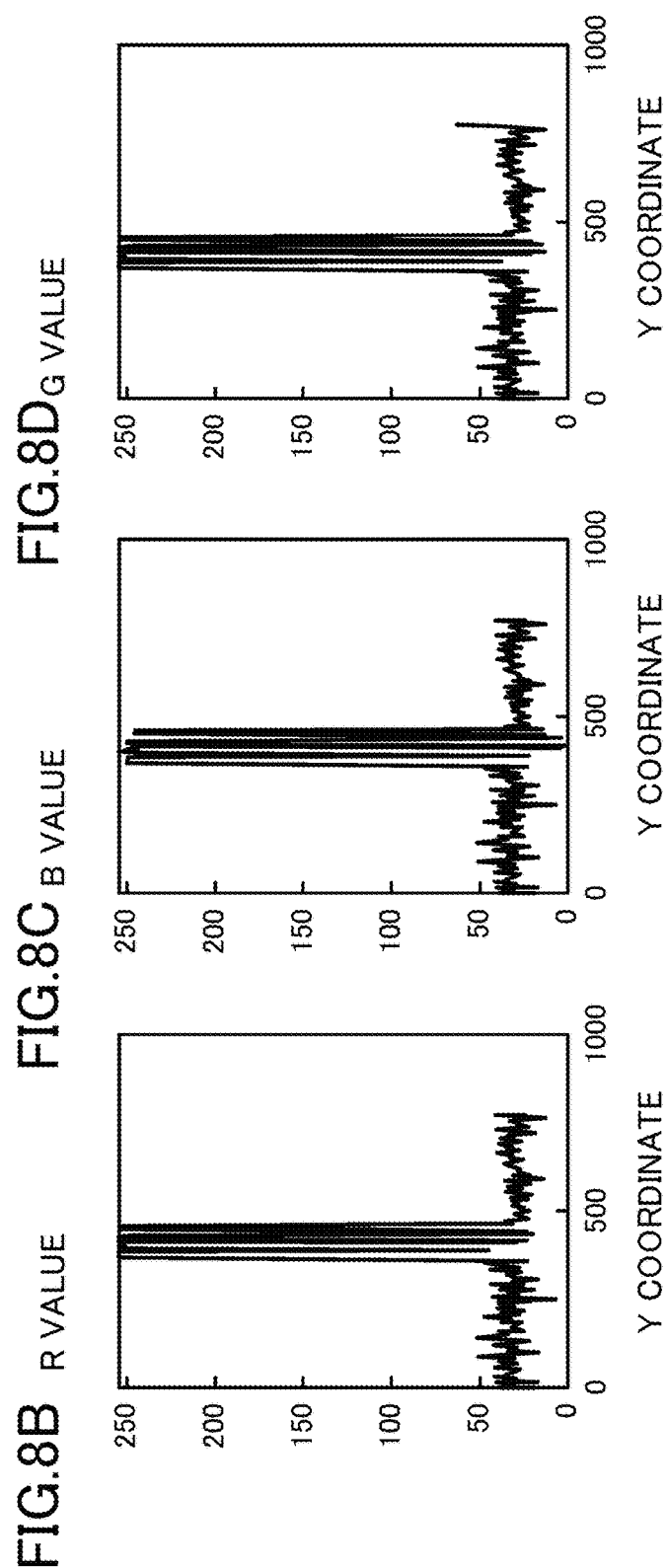

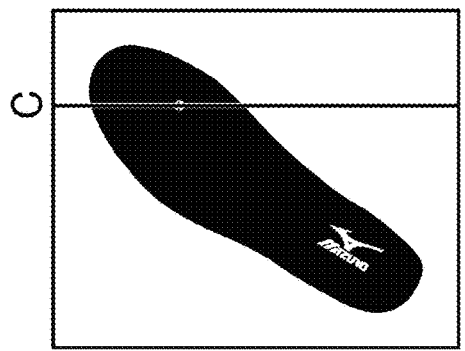
FIG.9A
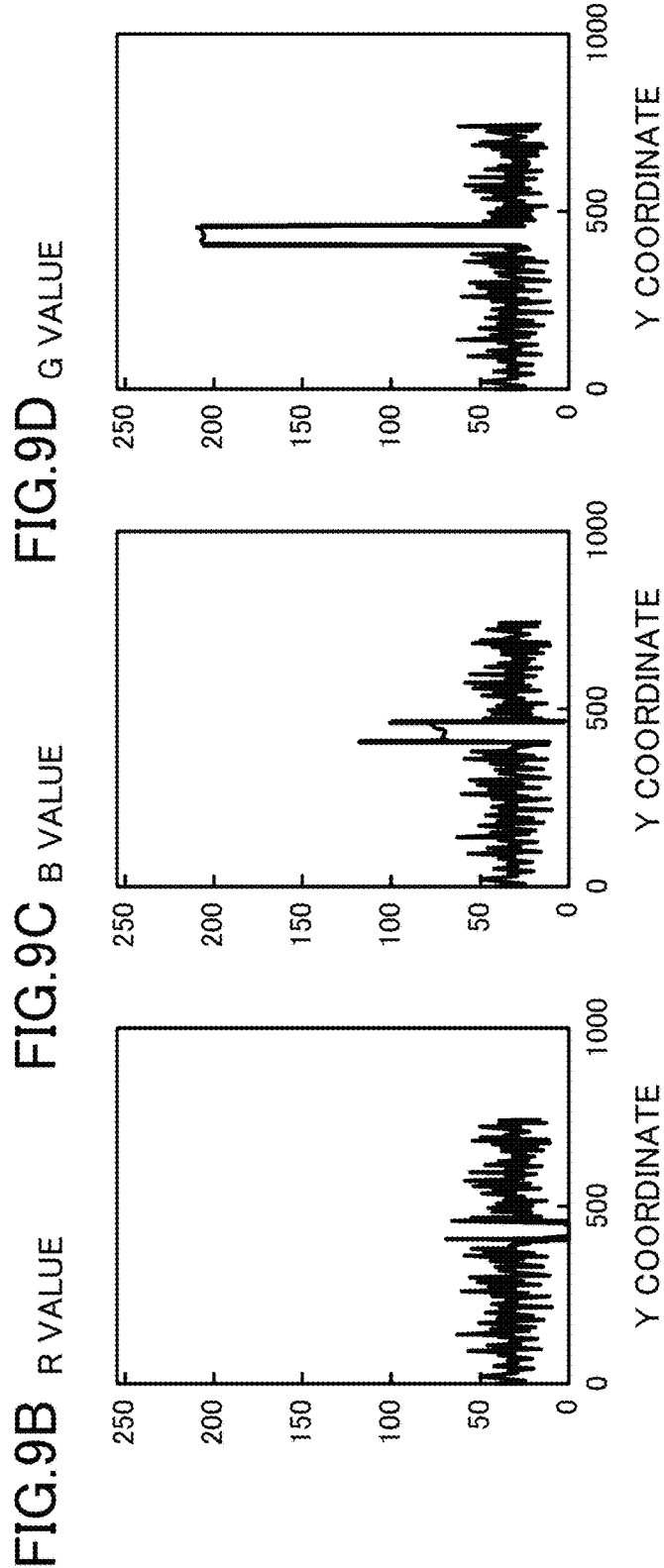
FIG.9B R VALUE
FIG.9C B VALUE
FIG.9D G VALUE

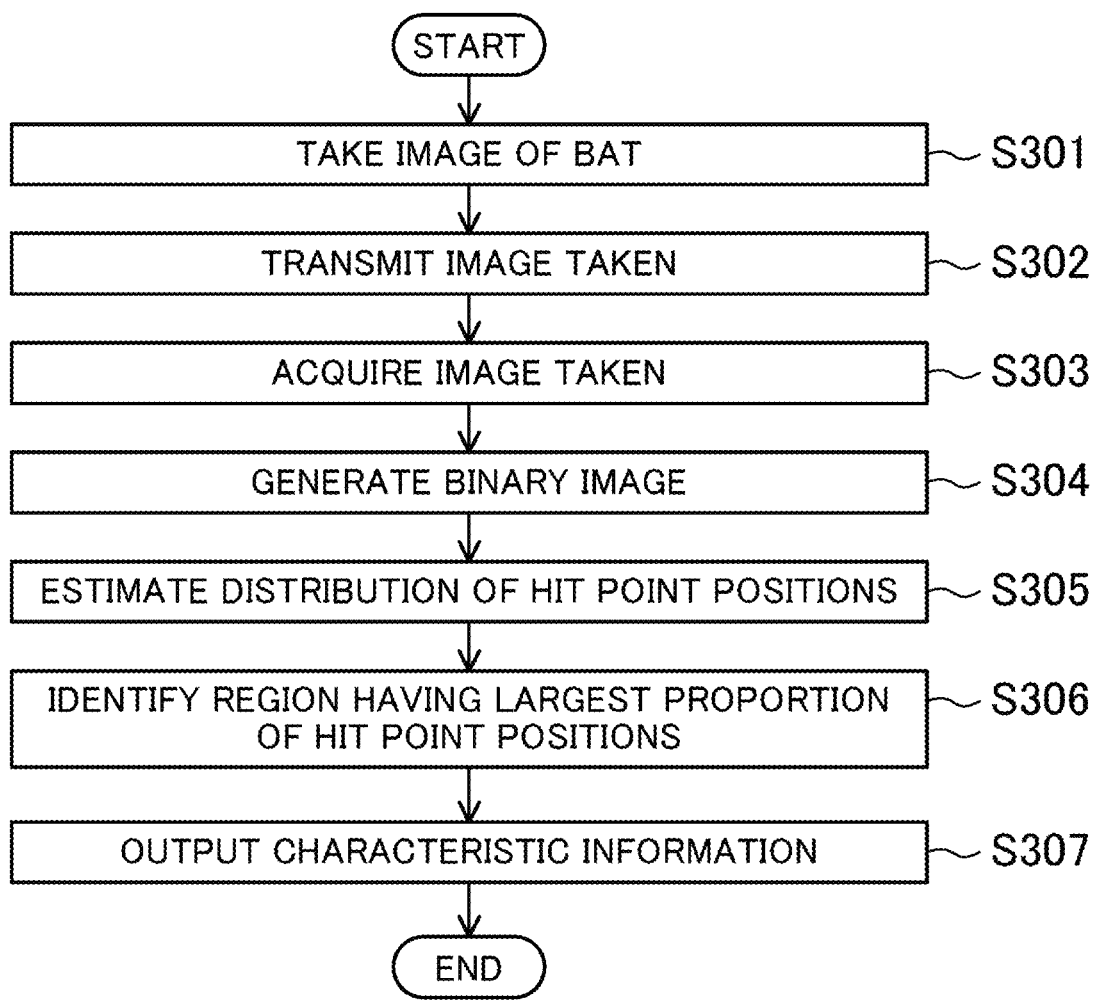

| DISTANCE FROM TIP(inch) | 8 | 7 | 6 | 5 | 4 | 3 |
|---|---|---|---|---|---|---|
| BAT A | 0.49 | 0.50 | 0.51 | 0.50 | 0.49 | 0.47 |
| BAT B | 0.48 | 0.49 | 0.50 | 0.51 | 0.50 | 0.49 |
| BAT C | 0.46 | 0.48 | 0.50 | 0.52 | 0.50 | 0.47 |

METHOD FOR PROCESSING INFORMATION, INFORMATION PROCESSOR, AND INFORMATION PROCESSING PROGRAM

CROSS-REFERENCE TO RELATED APPLICATION

This application claims priority to Japanese Patent Application No. 2019-063078 filed on Mar. 28, 2019, the entire disclosure of which is incorporated by reference herein.

BACKGROUND ART

The present disclosure relates to a method for processing information, an information processor, and an information processing program to output characteristic information on at least either sports equipment or a method for using the sports equipment by a user.

Japanese Patent No. 5314224 discloses an information processor that, based on moving image data obtained by taking a moving image of a subject running with markers worn, generates characteristic information on a running form of the subject.

SUMMARY

There is a demand to obtain characteristic information based on a trace of use appearing on the appearance of sports equipment or an installed tool installed on the sports equipment.

The present disclosure has been made in view of the above point, and an object thereof is to obtain characteristic information based on a trace of use appearing on the appearance of sports equipment or an installed tool installed on the sports equipment.

To achieve the above object, a first aspect of the present disclosure is a method for allowing an information processor to output characteristic information on at least either sports equipment or a method for using the sports equipment by a user, the method including: allowing the information processor to execute image acquisition processing acquiring an image of the sports equipment after use, of the sports equipment with a mark attached, or of an installed tool installed, during use of the sports equipment, on the sports equipment; allowing the information processor to execute position identification processing identifying a position likely to be damaged of the sports equipment by performing detection of a color change place, a shape change place, or the mark on the image acquired in the image acquisition processing; and allowing the information processor to execute information outputting processing outputting the characteristic information based on the position identified in the position identification processing.

This first aspect can obtain the characteristic information based on a trace of use appearing on the appearance of the sports equipment or the installed tool installed on the sports equipment, that is, at least either a color change or a shape change.

The information processor can generate the characteristic information based on the image of the sports equipment or the installed tool to eliminate the necessity of using moving image data for generation of the characteristic information, and thus the storage capacity of a storage device provided in the information processor can be reduced.

A second aspect of the present disclosure is an embodiment of the first aspect. In the second aspect, in the position identification processing, the information processor performs detection of the color change place by referring to an image of the sports equipment or the installed tool before use of the sports equipment.

This second aspect enables appropriate detection of the color change place even when the colors of the color change place and a pattern of the sports equipment are similar to each other.

A third aspect of the present disclosure is an embodiment of the first aspect. In the third aspect, the characteristic information is information identifying any from a plurality of kinds of the sports equipment.

This third aspect enables a provider and a user to recognize sports equipment appropriate for the user by referring to the characteristic information.

A fourth aspect of the present disclosure is an embodiment of the first aspect. In the fourth aspect, the characteristic information is information indicating the position identified in the position identification processing.

This fourth aspect enables the provider and the user to recognize a position likely to be damaged of the sports equipment by referring to the characteristic information.

A fifth aspect of the present disclosure is an embodiment of the first aspect. In the fifth aspect, the sports equipment is a component of a shoe.

This fifth aspect enables the provider and the user to acquire the characteristic information on at least either the component of the shoe or a method for using the component by the user.

A sixth aspect of the present disclosure is an embodiment of the first aspect. In the sixth aspect, the sports equipment is a batting tool.

This sixth aspect enables the provider and the user to acquire the characteristic information on at least either the batting tool or a method for using the batting tool by the user.

A seventh aspect of the present disclosure is an information processor outputting characteristic information on at least either sports equipment or a method for using the sports equipment by a user, the information processor including: an image acquisition unit acquiring an image of the sports equipment after use, of the sports equipment with a mark attached, or of an installed tool installed, during use of the sports equipment, on the sports equipment; a position identification unit identifying a position likely to be damaged of the sports equipment by performing detection of a color change place, a shape change place, or the mark on the image acquired by the image acquisition unit; and an information output unit outputting the characteristic information based on the position identified by the position identification unit.

This seventh aspect can obtain the characteristic information based on a trace of use appearing on the appearance of the sports equipment or the installed tool installed on the sports equipment, that is, at least either a color change or a shape change.

The information processor can generate the characteristic information based on the image of the sports equipment or of the installed tool after use to eliminate the necessity of using moving image data for generation of the characteristic information, and thus the storage capacity of a storage device provided in the information processor can be reduced.

An eighth aspect of the present disclosure is a non-transitory computer readable medium storing a program allowing an information processor to output characteristic information on at least either sports equipment or a method for using the sports equipment by a user, the non-transitory computer readable medium allowing the information processor to execute: image acquisition processing acquiring an image of the sports equipment after use, of the sports equipment with a mark attached, or of an installed tool installed, during use of the sports equipment, on the sports equipment; position identification processing identifying a position likely to be damaged of the sports equipment by performing detection of a color change place, a shape change place, or the mark on the image acquired in the image acquisition processing; and information outputting processing outputting the characteristic information based on the position identified in the position identification processing.

This eighth aspect can obtain the characteristic information based on a trace of use appearing on the appearance of the sports equipment or the installed tool installed on the sports equipment, that is, at least either a color change or a shape change.

The information processor can generate the characteristic information based on the image of the sports equipment or of the installed tool after use to eliminate the necessity of using moving image data for generation of the characteristic information, and thus the storage capacity of a storage device provided in the information processor can be reduced.

The present disclosure can obtain characteristic information based on a trace of use appearing on the appearance of sports equipment or an installed tool installed on the sports equipment.

BRIEF DESCRIPTION OF THE DRAWINGS

FIG. 6A is a diagram illustrating a regression line of the contour of the insole on the coordinate plane, and FIG. 6B is a diagram with the contour of the insole rotated on the coordinate plane by the slope of the regression line illustrated in FIG. 6A.

FIG. 8A is a diagram of the image taken of the insole, FIG. 8B is a graph of an R value on a line B in FIG. 8A, FIG. 8C is a graph of a B value on the line B in FIG. 8A, and FIG. 8D is a graph of a G value on the line B in FIG. 8A.

FIG. 9A is a diagram of the image taken of the insole, FIG. 9B is a graph of an R value on a line C in FIG. 9A, FIG. 9C is a graph of a B value on the line C in FIG. 9A, and FIG. 9D is a graph of a G value on the line C in FIG. 9A.

FIG. 12 is a flowchart of a procedure acquiring characteristic information using the information processing system including the information processor according to a second embodiment of the present disclosure.

DETAILED DESCRIPTION

Embodiments of the present disclosure will be described with reference to the drawings.

First Embodiment

Figure 1:
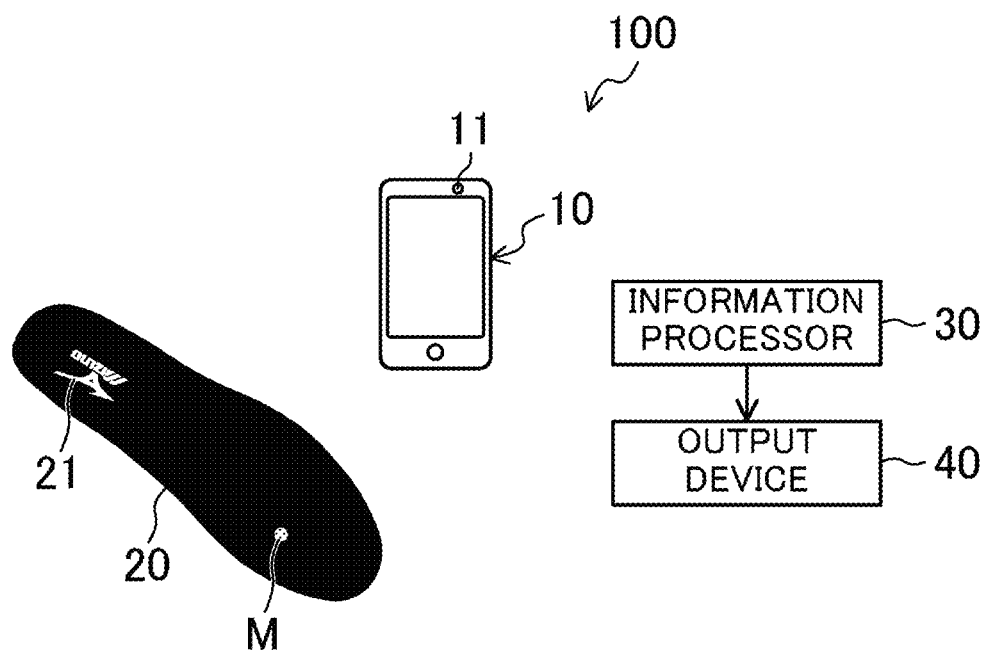
FIG. 1 is a diagram of a configuration of an information processing system including an information processor according to a first embodiment of the present disclosure.

FIG. 1 illustrates a configuration of an information processing system 100. This information processing system 100 includes a smartphone 10 having an image-taking function, an information processor 30 according to a first embodiment of the present disclosure generating characteristic information on an insole 20 as a component of a shoe based on an image taken by the smartphone 10, and an output device 40 outputting the characteristic information generated by the information processor 30.

The smartphone 10 has a camera 11 and can transmit an image taken by the camera 11 to the information processor 30 through a wired communication function such as universal serial bus (USB) or a wireless communication function such as a wireless local area network (LAN). The information processor 30 includes a central processing unit (CPU), a storage device, and software, and is configured as, for example, a personal computer (PC). The information processor 30 has a function of receiving information from external devices through a wired communication function such as USB or a wireless communication function such as a wireless LAN. The output device 40 is configured as, for example, a monitor or a printer that visually outputs information. The output device 40 may output the characteristic information using a method, such as voice, other than the visual sense, or a combination of two or more output methods such as audiovisual information.

Figure 2:
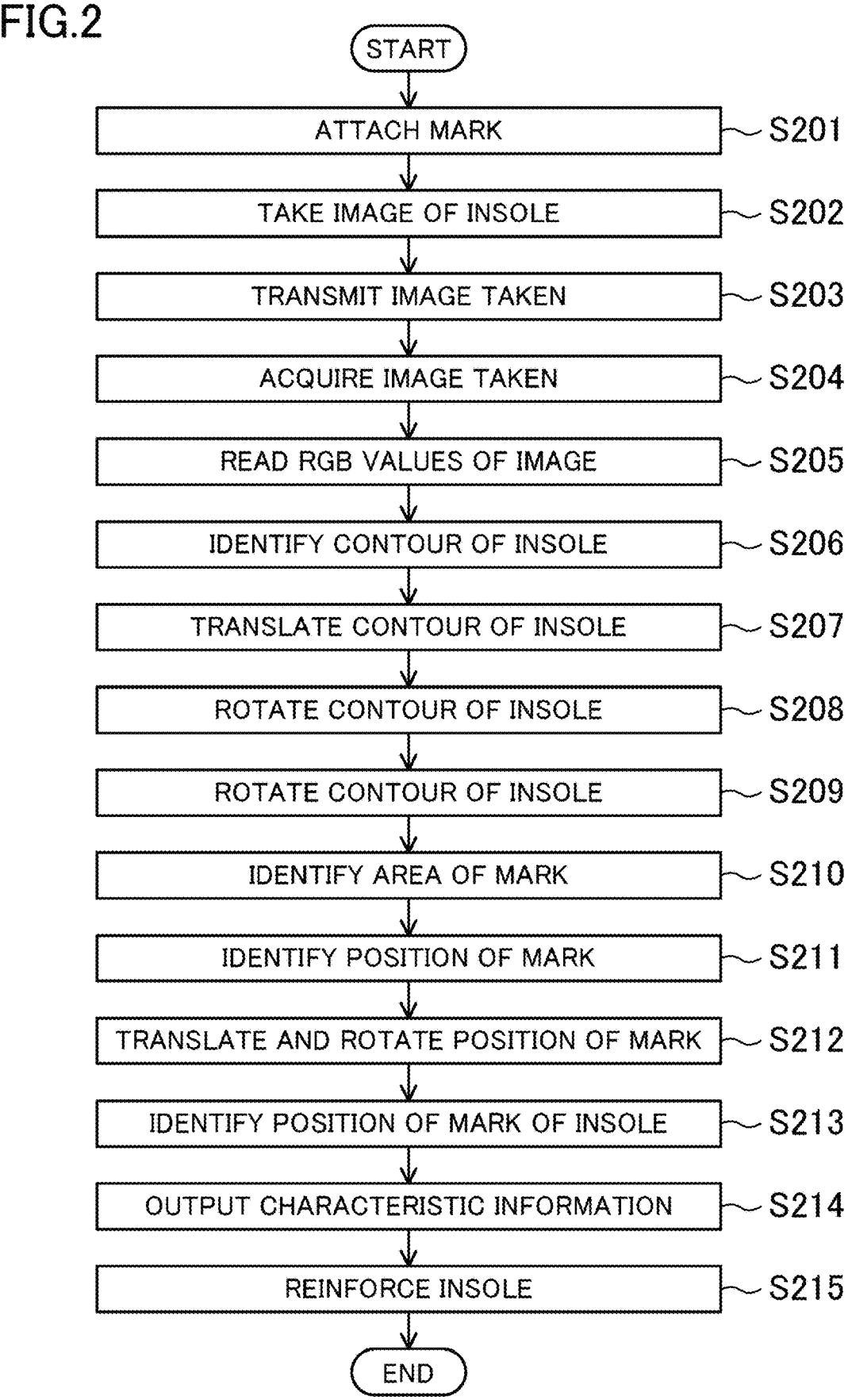
FIG. 2 is a flowchart of a procedure providing a user with an insole using the information processing system including the information processor according to the first embodiment.

Next, a procedure providing a user with the insole 20 using the above-configured information processing system 100 will be described with reference to the flowchart in FIG. 2. In this procedure, the function of the information processor 30 is achieved by allowing the CPU to execute programs stored in a non-transitory computer readable medium such as an optical disk or a memory card, or programs downloaded via communication equipment. In this procedure, the information processor 30 performs functions of an image acquisition unit, a position identification unit, and an information output unit.

The insole 20 is formed of an ethylene-vinyl acetate copolymer (EVA) or the like. A logo mark 21 is indicated in white near a rear end portion of an upper surface of the insole 20, with the upper surface of the insole 20 except the logo mark 21 being black.

First, at Step (S) 201, a provider or a user attaches a green, circular mark (sticker) M to an upper surface of a most worn and depressed portion (a shape change place) of the insole 20 after use.

Figure 3:
FIG. 3 is a diagram of an image taken of an insole after use with a mark attached.

Next, at Step 202, the provider or the user takes an image of the upper surface of the insole 20 with the camera 11 of the smartphone 10. Image taking is performed with the camera 11 of the smartphone 10 facing the upper surface of the insole 20 with a spacing of about 50 cm, with a background of the insole 20 being white, and with a toe of the insole 20 directed upward in a photograph. FIG. 3 illustrates an image obtained by image taking at Step 202. In FIG. 3, the mark M is indicated by an area with a dot pattern.

Next, at Step 203, the smartphone 10 transmits the image taken at Step 202 to the information processor 30 through an Internet communication function or a wireless LAN function.

At Step 204, the information processor 30 receives and acquires the image transmitted at Step 203 through the Internet communication function or the wireless LAN function.

Next, at Step 205, the information processor 30 reads RGB values of the image received at Step 204. For example, the RGB values are read as an 8-bit unsigned integer array using the imread function of Matlab (registered trademark).

Figure 4A:
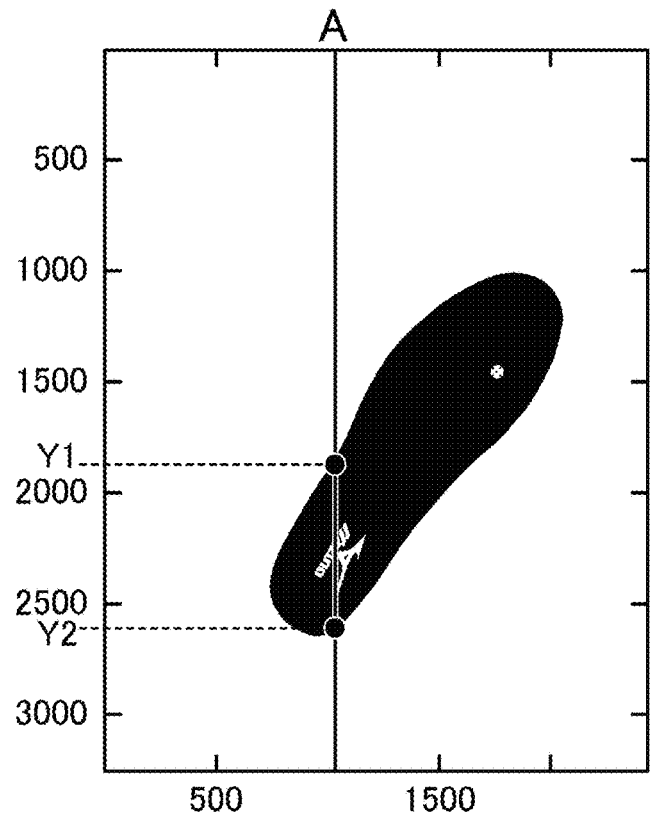
FIG. 4A is a diagram illustrating the insole the image of which has been taken on a coordinate plane.
Figure 4B:
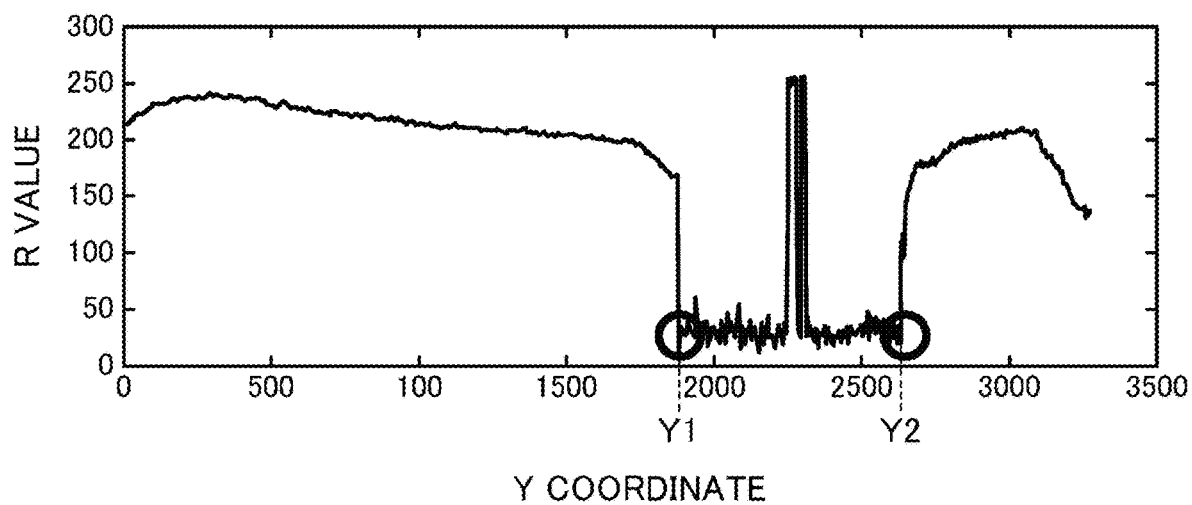
FIG. 4B is a graph of an R value on a line A in FIG. 4A.
Figure 5:
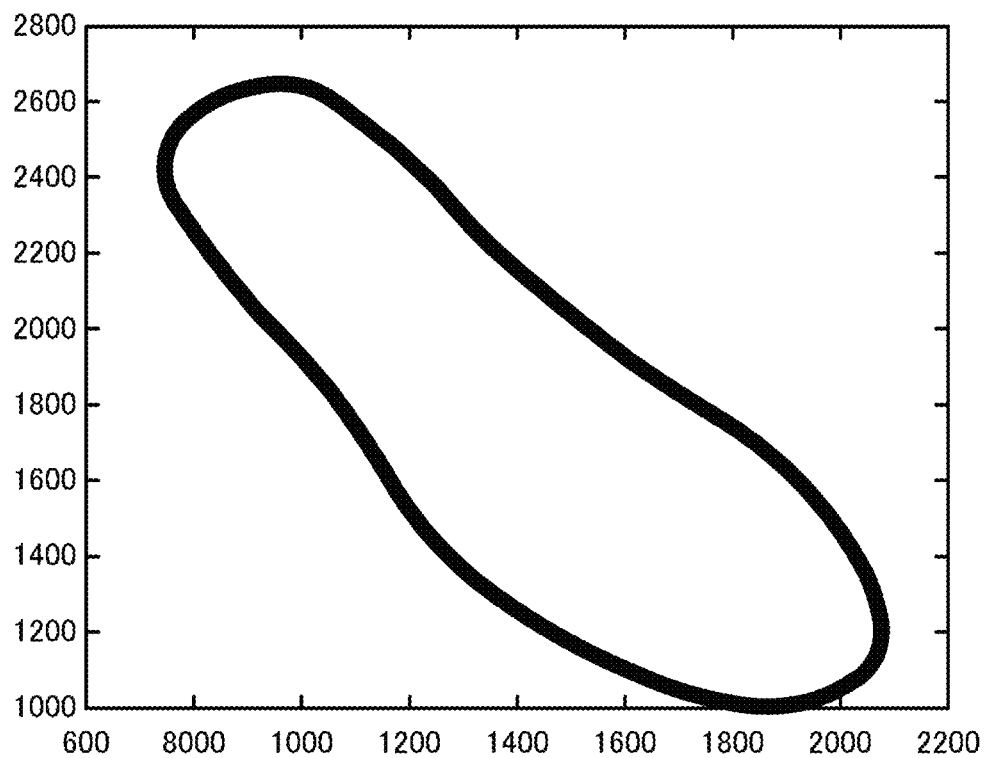
FIG. 5 is a diagram illustrating an identified contour of the insole on the coordinate plane.

Next, at Step 206, the information processor 30 identifies a contour of the insole 20 the image of which has been taken on a coordinate plane. Specifically, a point at which any one of the R value, the G value, and the B value read at Step 205 significantly changes on each straight line extending in a Y-axial direction on the coordinate plane is identified as a point forming the contour. The Y axis extends such that a Y coordinate gradually increases from a heel toward a toe. In FIG. 4A, A indicates one straight line extending in the Y-axial direction. As also illustrated in FIG. 4B, on the straight line A, points at which Y coordinate values are Y1 and Y2 are identified as points forming the contour. Note that identification of the point forming the contour can be performed by using a known method of edge detection such as a method that identifies a point at which the slope of the graph illustrated in FIG. 4B is not less than a certain threshold. FIG. 5 illustrates the contour of the insole 20 identified at Step 206 on the coordinate plane.

Next, at Step 207, the information processor 30 translates the contour of the insole 20 on the coordinate plane such that the center of gravity (a geometrical center) of the points forming the contour of the insole 20 identified at Step 206 is positioned at a point of origin. FIG. 6A illustrates the contour of the insole after the translation at Step 207.

Next, at Step 208, the information processor 30 performs linear regression on all the points forming the contour of the insole 20 after the translation at Step 207 to derive the regression line illustrated in FIG. 6A. As illustrated in FIG. 6B, the contour of the insole 20 is rotated on the coordinate plane by the slope of the regression line illustrated in FIG. 6A.

Figure 7A:
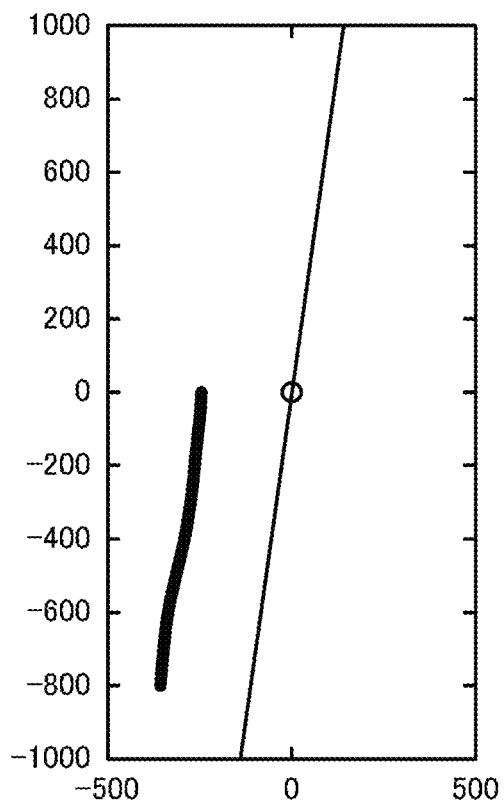
FIG. 7A is a diagram illustrating a regression line of an inside portion of a substantially heel side half of the contour of the insole on the coordinate plane.
Figure 7B:
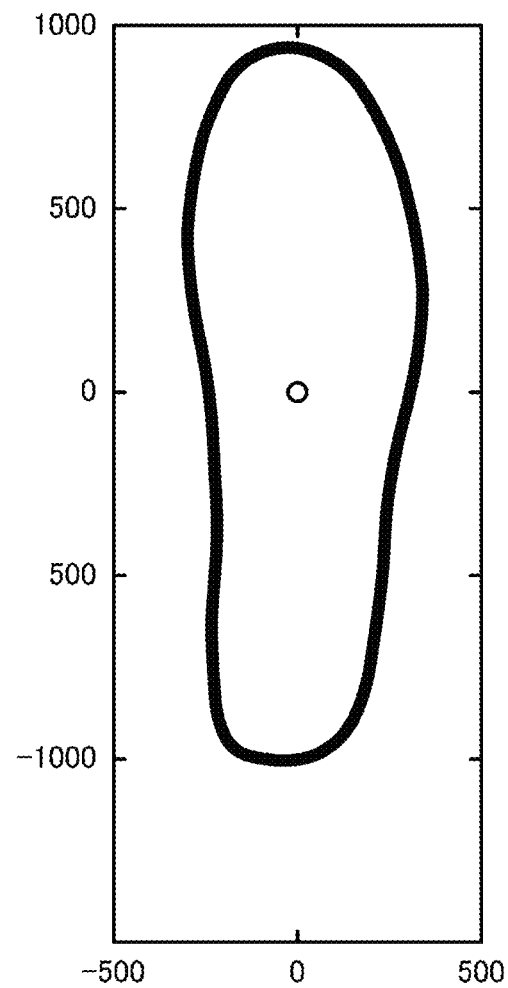
FIG. 7B is a diagram with the contour of the insole illustrated in FIG. 6B rotated on the coordinate plane by the slope of the regression line illustrated in FIG. 7A.

Next, at Step 209, the information processor 30 performs linear regression on all the points forming an inside portion of a substantially heel side half of the contour of the insole 20 after the rotation at Step 208 to derive the regression line illustrated in FIG. 7A. Then, as illustrated in FIG. 7B, the contour of the insole 20 is rotated on the coordinate plane by the slope of the regression line illustrated in FIG. 7A.

Next, at Step 210, the information processor 30 graphs RGB values of a portion inside the contour of the insole 20 on each straight line extending in the Y-axial direction on the coordinate plane among the RGB values of the image read at Step 205. Then, an area in which any one of the R value, the G value, and the B value exceeds a threshold TH and the residual two thereof are not more than the threshold TH is identified (detected) as an area of a mark M. The threshold TH, which is set to 200, may be set to another appropriate value. In FIG. 8A, B is a straight line extending in the Y-axial direction and passing through the logo mark 21. As illustrated in FIG. 8B to FIG. 8D, in a portion inside the contour of the insole 20 of the straight line B, all the R value, the G value, and the B value exceed the threshold TH at a place corresponding to the logo mark 21. In FIG. 9A, C is a straight line extending the Y-axial direction and passing through the mark M. As illustrated in FIG. 9B to FIG. 9C, in a portion inside the contour of the insole 20 of the straight line C, the R value and the B value are not more than the threshold TH at a place corresponding to the mark M. On the other hand, as illustrated in FIG. 9D, at the place corresponding to the mark M, the G value exceeds the threshold TH.

Figure 10:
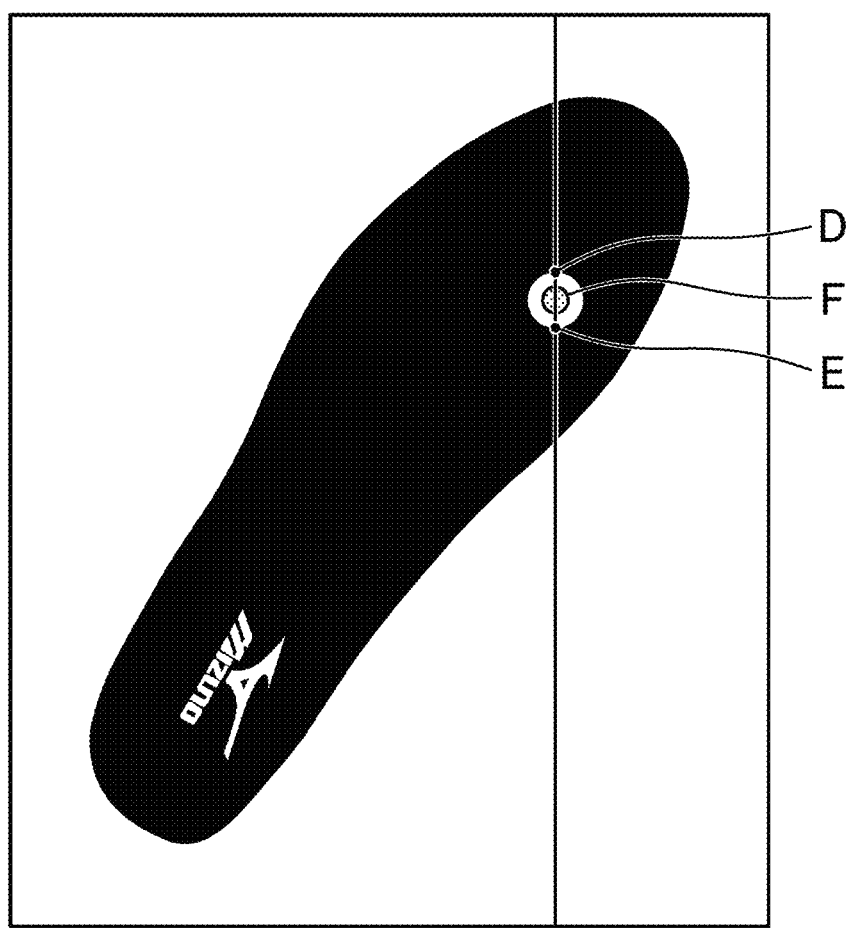
FIG. 10 is an illustrative diagram of a position of a mark identified on the image taken of the insole.

Then, at Step 211, the information processor 30 identifies a middle point of both ends in the Y-axial direction of a place having the largest distance between the both ends in the Y-axial direction in the area of the mark M identified at Step 210 as a position of the mark M. D and E in FIG. 10 indicate the both ends in the Y-axial direction of the place having the largest distance between the both ends in the Y-axial direction in the area of the mark M identified at Step 210, whereas F indicates the middle point of the both ends in the Y-axial direction.

Next, at Step 212, the information processor 30 performs the translation and the rotation performed on the contour of the insole 20 at Step 207, Step 208, and Step 209 on the position of the mark M identified at Step 211.

Figure 11:
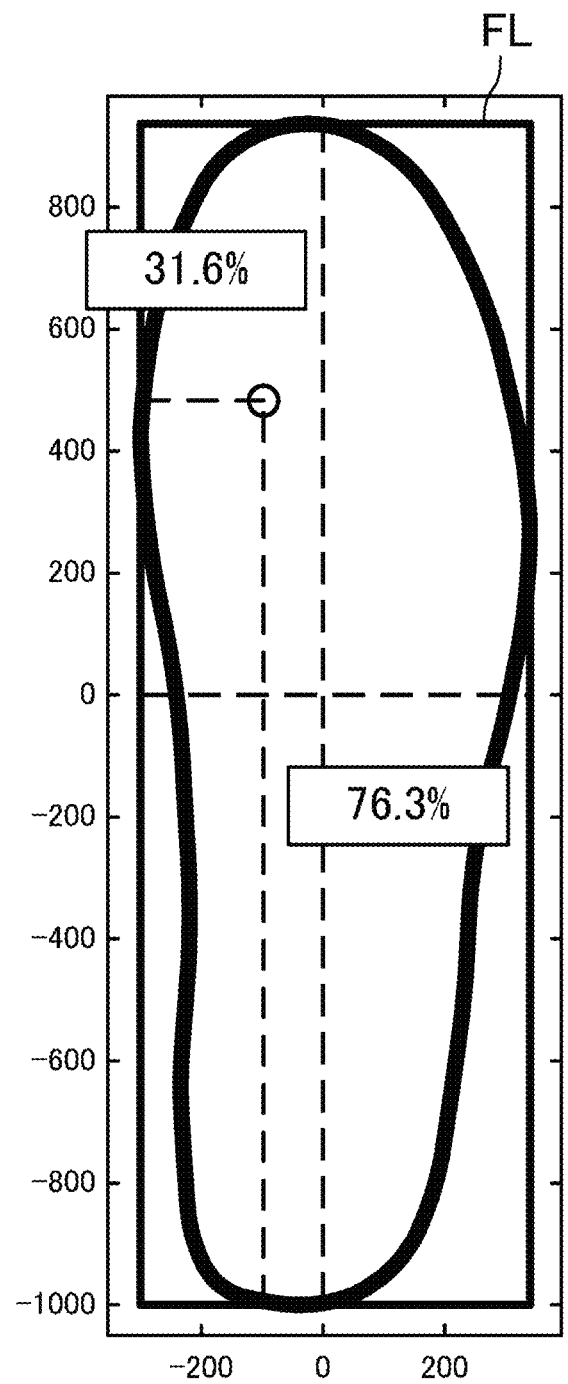
FIG. 11 is an illustrative diagram illustrating the position of the mark corresponding to the contour of the insole illustrated in FIG. 7B on the coordinate plane.

Then, at Step 213, based on the contour of the insole 20 after the rotation at Step 209, as illustrated in FIG. 11, the information processor 30 creates a frame FL extending over a foot length of the contour with a foot width of the contour. Then, the information processor 30 identifies a position of the mark M within the frame FL after performing the translation and the rotation at Step 212 as a position likely to be damaged of the insole 20. The damage includes damage through deterioration. Specifically, identified is what percentage of the foot length is taken up by the spacing between the mark M and a heel (a lower end of the frame FL) in a foot length direction and what percentage of the foot width is taken up by the spacing between the mark M and an inner instep (a left end of the frame FL) in a foot width direction.

Next, at Step 214, the information processor 30 outputs information indicating the position identified at Step 213 as characteristic information. Then, the output device 40 outputs the characteristic information output by the information processor 30.

Next, at Step 215, the provider of the insole 20 refers to the characteristic information output at Step 214 and reinforces the position indicated by the characteristic information of the insole 20 the image of which has been taken with a reinforcing member. The reinforcing member is formed of a material hard to wear such as polyurethane (PU).

Consequently, the first embodiment can acquire the characteristic information based on a trace of use appearing on the appearance of the insole 20 after use.

The information processor 30 generates the characteristic information based on the image of the insole 20 after use to eliminate the necessity of using moving image data for generation of the characteristic information, and thus the storage capacity of a storage device provided in the information processor 30 can be reduced. In addition, time and effort to force the user to do a test run in order to obtain moving image data are eliminated.

The mark M can be detected easily based on the RGB values of the image, thus enabling more reliable identification of the position likely to be damaged than a case in which the mark M is not used.

Variation of First Embodiment

In the first embodiment, the information processor 30 outputs the information indicating the position identified a Step 213 as the characteristic information. Based on the position identified at Step 213, information indicating a method for improving a method for using the insole 20 by the user may be output as the characteristic information. For example, when the insole 20 is for walking, information indicating a method for improving a way of walking (a method of use) by the user may be output as the characteristic information.

In the first embodiment, at Step 215, the provider of the insole 20 reinforces the insole 20 the image of which has been taken. The insole 20 as a whole including an insole body and a reinforcing member reinforcing part of the insole body may newly be provided. In such a case, the insole body is formed of an ethylene-vinyl acetate copolymer (EVA), whereas the reinforcing member is formed of a material hard to wear such as polyurethane, and a place to be reinforced of the insole body with the reinforcing member is set at the position indicated by the characteristic information, whereby lengthening of the life of the insole 20 can be achieved.

In the first embodiment, the information processor 30 outputs the characteristic information on the insole 20 based on the image of the insole 20. Based on an image of an outsole, the characteristic information indicating a position likely to be damaged of the outsole may be output. Then, a provider of the outsole may reinforce a position indicated by the characteristic information of the outsole the image of which has been taken. The provider of the outsole may newly provide an outsole as a whole with the position indicated by the characteristic information reinforced with a reinforcing member. When the entire outsole is formed of rubber, the reinforcing member is formed of rubber more excellent in wear resistance than the portion other than the reinforcing member, whereby lengthening of the life of the outsole can be achieved.

With the mark M attached to a broken place or a damaged place of uppers of a shoe, a provider or a user may take an image of the uppers, and the information processor 30 may output the characteristic information indicating a position likely to be damaged of the uppers based on the taken image. Then, the provider of the uppers may reinforce the position indicated by the characteristic information of the uppers the image of which has been taken. Examples of the method for reinforcing the uppers include a method that applies a resin coating to the position indicated by the characteristic information. The provider of the uppers may newly provide uppers as a whole with a reinforcing member laid on the position indicated by the characteristic information.

A provider or a user may take an image of a bottom surface of a shoe with the mark M attached to a worn cleat, and the information processor 30 may output the characteristic information identifying a cleat likely to be damaged among a plurality of resin cleats provided on the bottom surface of the shoe based on the taken image. Then, the provider of the shoe may replace the cleat identified by the characteristic information with a cleat the tip of which is formed of a material higher in wear resistance than the other cleats. The provider of the shoe may provide a new shoe with the cleat the tip of which is formed of a material higher in wear resistance than the other cleats used as the cleat identified by the characteristic information. For the tip material of the cleat at the position likely to be damaged, for example, thermoplastic polyurethane (TPU) can be used, whereas for a tip material of the other cleats, a polyamide elastomer can be used.

In the first embodiment, the mark M is green, may be read or blue, and may be a color different from that of the insole 20. The mark M is green, red, or blue, whereby identification of the position of the mark M based on the RGB values is easy.

When there is a portion of the same color as that of the mark M on the upper surface of the insole 20, the portion is filled in with black, whereby false detection of the position of the mark M can be prevented.

In the first embodiment, the area other than the logo mark 21 on the upper surface of the insole 20 is black. Alternatively, it may be white. In such a case, the background of the insole 20 at the time of image taking at Step 202 is made black, whereby identification of the contour of the insole 20 is easy. The area other than the logo mark 21 on the upper surface of the insole 20 may be a color other than black and white. In such a case, the background of the insole 20 at the time of image taking at Step 202 is made a color different from a perimeter portion of the insole 20, whereby identification of the contour of the insole 20 is enabled.

Second Embodiment

The information processing system 100 including the information processor 30 according to a second embodiment of the present disclosure is used for acquiring characteristic information on a bat as a batting tool by a procedure illustrated in FIG. 12. The function of the information processor 30 according to the second embodiment is achieved by allowing the CPU to execute programs different from those of the information processor 30 of the first embodiment.

First, at Step 301, a provider or a user takes an image of a tip portion of a black bat after use with the camera 11 of the smartphone 10.

Next, at Step 302, the smartphone 10 transmits the image taken at Step 301 to the information processor 30 through the Internet communication function or the wireless LAN function.

At Step 303, the information processor 30 receives the image transmitted at Step 302 through the Internet communication function or the wireless LAN function.

Figure 13A:
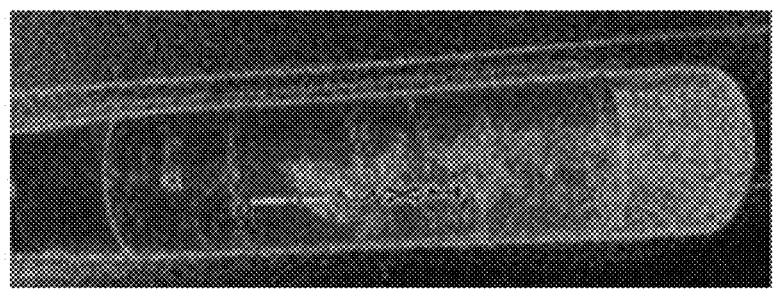
FIG. 13A is a binary image of a photograph taken of a bat after use.

Next, at Step 304, the information processor 30 generates (acquires) a binary image of the image received at Step 303. FIG. 13A illustrates the binary image generated at Step 304.

Figure 13B:
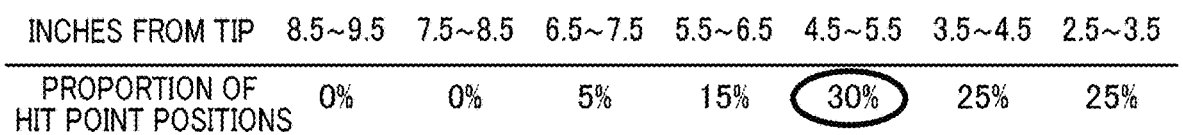
FIG. 13B is a table listing a distribution of hit point positions estimated based on the binary image in FIG. 13A.

Next, at Step 305, the information processor 30 performs detection of white pixels (a color change place) increased from a binary image of a new (before use) bat on the binary image generated at Step 304. Then, a distribution of the detected white pixels is estimated as a distribution of hit point positions. Specifically, for each region obtained by dividing the tip portion of the bat in a longitudinal direction, the proportion of the number of the increased white pixels at each region to the number of all the increased white pixels is calculated. The information processor 30 stores therein the binary image of the new bat referred to in this process in advance. FIG. 13B illustrates the distribution of hit point positions estimated at Step 305. Thus, the binary image of the bat before use is referred to in order to estimate the distribution of hit point positions, and even when a grip, which is white in the binary image, is provided in the bat, the distribution of hit point positions can appropriately be estimated.

Next, at Step 306, the information processor 30 identifies a region having the largest proportion of hit point positions (the number of the increased white pixels) as a position likely to be damaged of the bat. In FIG. 13B, the proportion of hit point positions at the region identified at Step 306 is circled.

Figures 14A, 14B:
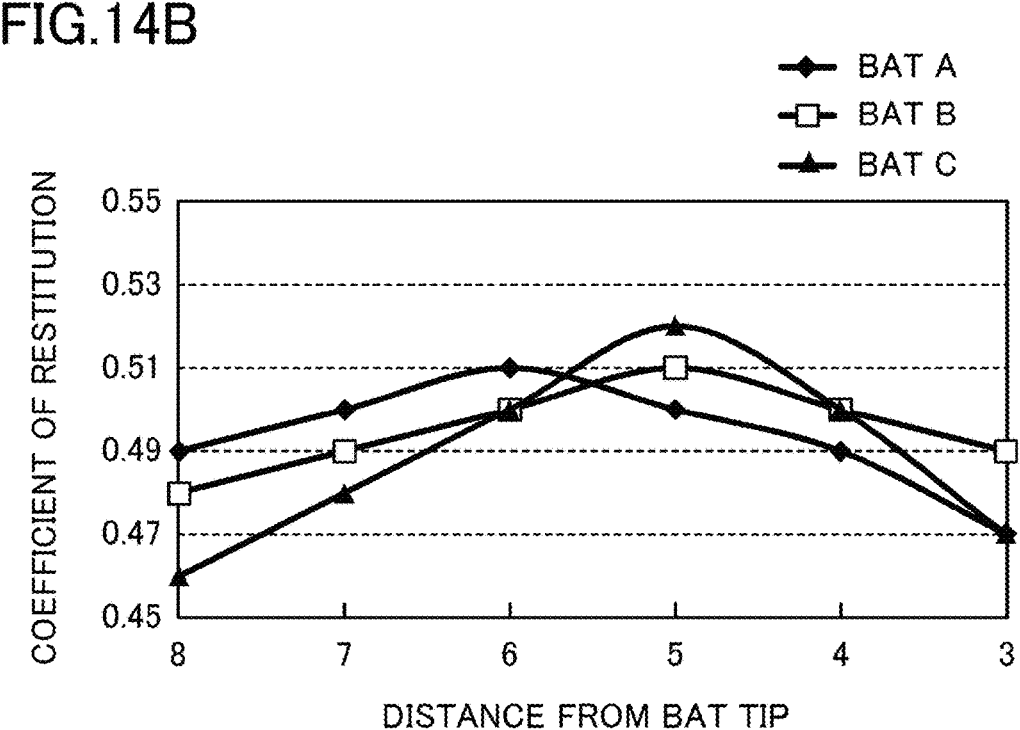
FIG. 14A is a table listing coefficients of restitution at respective regions of three kinds of bats.
FIG. 14B is a graph corresponding to the table in FIG. 14A.

Next, at Step 307, the information processor 30 selects a bat having the largest coefficient of restitution at the center of the region identified at Step 306 in the longitudinal direction from three kinds of bats A to C. Then, the information processor 30 outputs information identifying the selected bat as the characteristic information. FIG. 14A and FIG. 14B illustrate coefficients of restitution at respective positions of the bats A to C. When a region with a length from the tip of 4.5 to 5.5 inches is identified at Step 306, the coefficients of restitution at positions 5 inches from the tips of the bats A to C are 0.50, 0.51, and 0.52, respectively, and thus the bat C is selected. Then, the output device 40 outputs the characteristic information output by the information processor 30. Thus, the user or the provider acquires the characteristic information output by the output device 40 and can thereby recognize the kind of a bat optimum for the user.

The other configuration of the information processing system 100 is the same as that of the first embodiment, and a detailed description thereof is omitted.

Variation of Second Embodiment

In the second embodiment, at Step 307, the information processor 30 selects a bat having the largest coefficient of restitution of the region identified at Step 306 from the three kinds of bats A to C. Alternatively, a bat having the largest expected value of the coefficient of restitution may be selected. The expected value of the coefficient of restitution is the sum of the product of the coefficient of restitution at the center of each region of a bat in the longitudinal direction and the proportion of hit point positions calculated at Step 305. For example, the expected values of the bats A to C of the second embodiment are 0.492, 0.500, and 0.498, respectively, and thus the bat B, which has the largest expected value, is selected.

In the second embodiment, the position likely to be damaged of the bat is identified by performing detection of the white pixels on the taken image. As in the first embodiment, an image of the bat may be taken with the mark M attached to a place that has become white (a color change place), and the position likely to be damaged may be identified by performing detection of the mark M on the taken image.

In the second embodiment, detection of the color change place is performed on the image taken of the bat. Alternatively, detection of a shape change place may be performed, and the detected shape change place may be identified as the position likely to be damaged. For example, a place at which R (a radius of a round) of a contour of the bat in the image taken of the bat abruptly changes may be detected as the shape change place.

Third Embodiment

Figure 15:
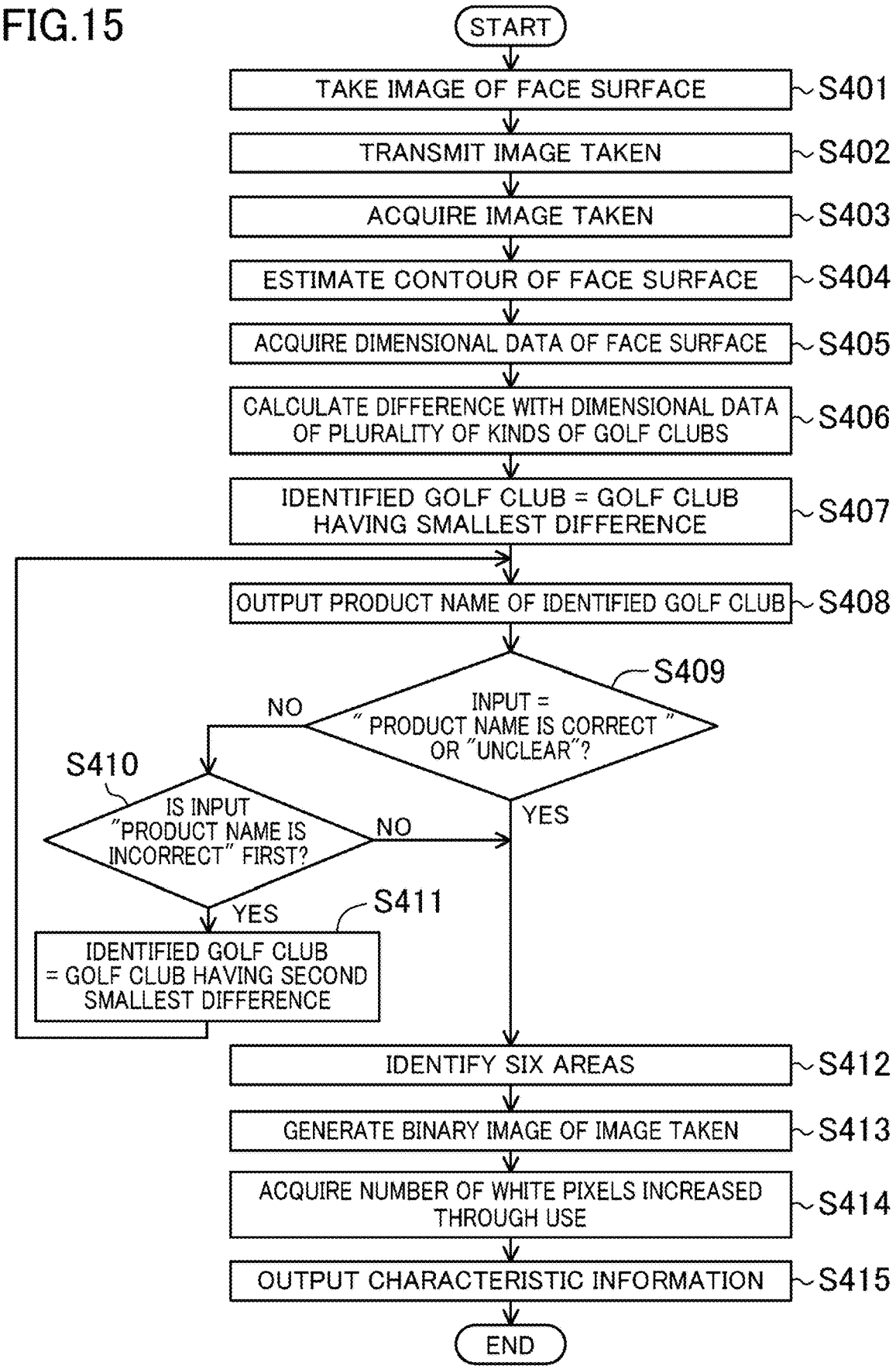
FIG. 15 is a view corresponding to FIG. 12 of a third embodiment.

The information processing system 100 including the information processor 30 according to a third embodiment of the present disclosure is used for acquiring characteristic information on a golf club as a batting tool by a procedure illustrated in FIG. 15. The function of the information processor 30 according to the third embodiment is achieved by allowing the CPU to execute programs different from those of the information processor 30 of the first embodiment.

First, at Step 401, a provider or a user takes an image of a face surface of a head of a golf club after use with the camera 11 of the smartphone 10.

Next, at Step 402, the smartphone transmits the image taken at Step 401 to the information processor 30 through the Internet communication function or the wireless LAN function.

At Step 403, the information processor 30 receives the image transmitted at Step 402 through the Internet communication function or the wireless LAN function.

Figure 16:
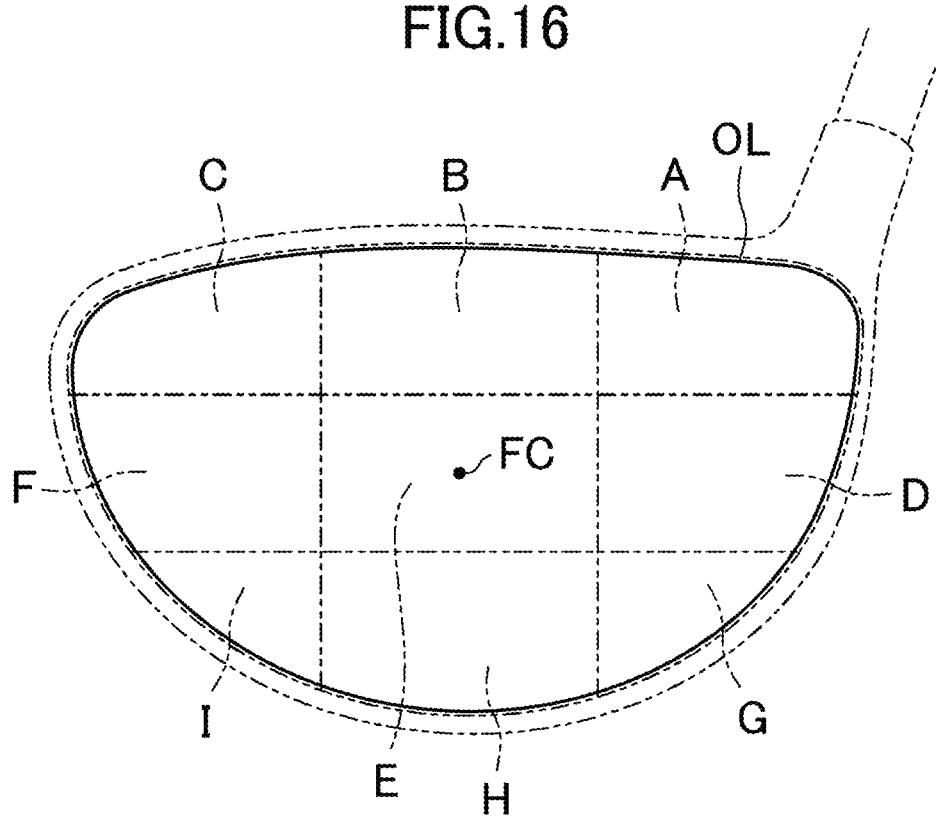
FIG. 16 is a schematic diagram of a contour of a face surface estimated at Step 404.

Next, at Step 404, the information processor 30 reads RGB values of the image received at Step 403 and estimates a contour of the face surface the image of which has been taken based on the read RGB values. FIG. 16 illustrates an estimated contour OL of the face surface. Note that estimation of the contour OL can be performed by a known method of edge detection.

Next, at Step 405, the information processor 30 acquires dimensional data of the face surface based on the contour OL of the face surface estimated at Step 404. The dimensional data is, for example, data indicating the width of the face surface in a right-and-left direction (the width of the widest place of the face surface in the right-and-left direction), the length of the face surface in an up-and-down direction (the length of the longest place of the face surface in the up-and-down direction), a center of gravity position (a centroid) of the face surface, or the like. When the golf club is an iron, for which detection of the contour OL of the face surface is impossible, or the like, the dimensional data may be acquired by estimating the face surface based on the difference between the length of the longest score line and the lengths of the topmost score line and the lowermost score line.

Next, at Step 406, the information processor 30 calculates the difference between the dimensional data acquired at Step 405 and pieces of dimensional data of a plurality of kinds of golf clubs. The information processor 30 stores therein the pieces of dimensional data of the kinds of golf clubs in advance.

Next, at Step 407, the information processor 30 identifies a golf club having the smallest difference calculated at Step 406 from the kinds of golf clubs and names the golf club identified an identified golf club.

Next, at Step 408, the information processor 30 causes the output device 40 to output a product name of the identified golf club. The user checks the product name output to the output device 40 and performs input indicating any one of the correctness of the product name, the incorrectness of the product name, and unclearness about whether the product name is correct to the information processor 30.

Next, at Step 409, the information processor 30 advances to Step 410 if the input performed at Step 408 indicates that the product name is incorrect or advances to Step 412 if the input performed at Step 408 indicates that the product name is correct or that whether the product name is correct is unclear.

At Step 410, the information processor 30 determines whether the number of times of receptions of input indicating that the product name is incorrect by the information processor 30 is once and advances to Step 411 if the number of times is once or advances to Step 412 if the number of times is twice or more.

At Step 411, the information processor 30 identifies a golf club having the second (next) smallest difference calculated at Step 406 from the kinds of golf clubs, names the golf club identified the identified golf club, and advances to Step 408.

Figure 17:
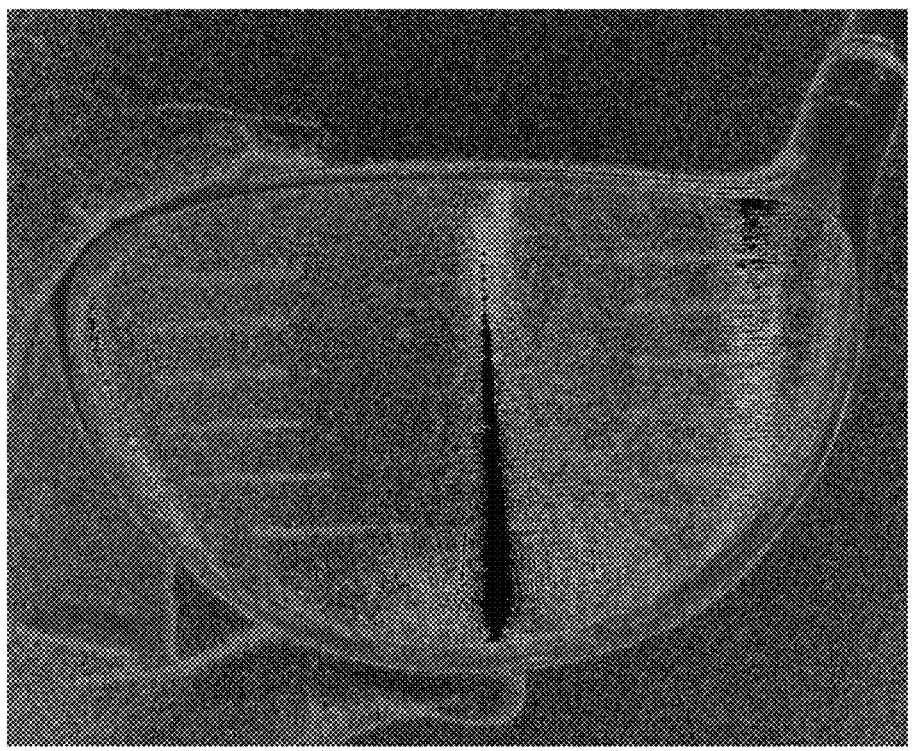
FIG. 17 is a binary image of a photograph taken of a face surface of a head of a golf club after use.

At Step 412, the information processor 30 identifies the center of gravity (the centroid) of the face surface as a face center FC illustrated in FIG. 16 based on the dimensional data acquired at Step 404. Then, around the face center FC, an area surrounded by the contour OL estimated at Step 404 is divided into nine areas A o I in three rows and three columns. In the topmost row, the areas A to C are arranged in order from a shaft side, in the middle row, the areas D to F are arranged in order from the shaft side, and in the lowermost row, the areas G to I are arranged in order from the shaft side. Each width of the areas B, E, and H in the right-and-left-direction is ⅓ of the width of the face surface in the right-and-left direction (the width of the widest place of the face surface in the right-and-left direction). Each length of the areas D to F in the up-and-down direction is ⅓ of the length of the face surface in the up-and-down direction (the length of the longest place of the face surface in the up-and-down direction). Next, at Step 413, the information processor 30 generates (acquires) a binary image of the image received at Step 403. FIG. 17 illustrates the binary image generated at Step 413.

Next, at Step 414, the information processor 30 performs detection of white pixels (a color change place) increased from a binary image of the identified golf club before use on the binary image generated at Step 413. Then, the numbers of the white pixels detected in the respective areas A to I are acquired. The information processor 30 stores therein the binary image of the identified golf club referred to in this process in advance.

Lastly, at Step 415, the information processor 30 identifies an area having the largest number of the white pixels acquired at Step 414 among the areas A to I as the position likely to be damaged and outputs information indicating the identified area as the characteristic information. Then, the output device 40 outputs the characteristic information output by the information processor 30. Thus, the user and the provider refer to the characteristic information output by the output device 40 and can thereby recognize that a swing (a method of use) by the user tends to cause a ball to hit the position indicated by the characteristic information.

The other configuration of the information processing system 100 is the same as that of the first embodiment, and a detailed description thereof is omitted.

Variation of Third Embodiment

In the third embodiment, the information processor 30 outputs the information identifying the area selected from the areas A to I as the characteristic information. Alternatively, based on the numbers of the white pixels detected in the respective areas A to I, the weight of a golf club suitable for the user may be calculated, and information identifying the calculated weight may be output as the characteristic information. More specifically, for example, when the proportion of the number of the white pixels detected in the area B (an upper face hit point) in FIG. 16 is large, a weight lighter than a certain weight (the weight of the identified golf club stored in advance or the like) may be calculated, whereas when the proportion of the number of the white pixels detected in the area H (a lower face hit point) in FIG. 16 is large, a weight heavier than the certain weight (the weight of the identified golf club stored in advance or the like) may be calculated.

Figure 18:
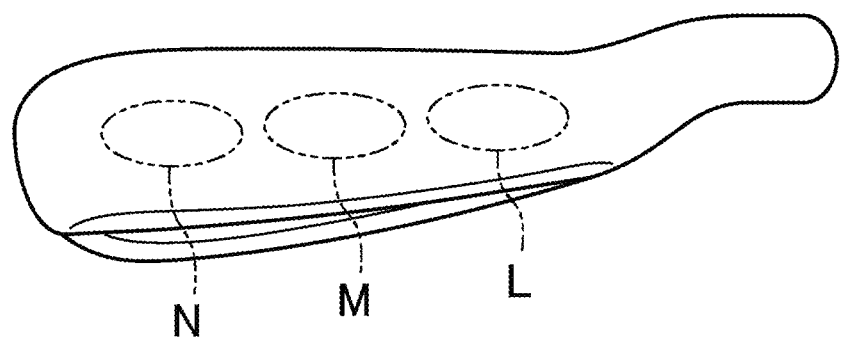
FIG. 18 is an illustrative diagram of three areas provided on a sole surface of a head of a golf club after use.

In the third embodiment, the information processor 30 performs detection of the color change place on the image taken of the face surface of the head of the golf club and outputs the information identifying the area selected from the areas A to I of the face surface as the characteristic information. However, detection of white pixels (a color change place) may be performed on an image taken of a sole surface of a head of an iron golf club after use, a lie angle of a golf club suitable for the user may be calculated based on the numbers of the white pixels detected in a plurality of areas provided on the sole face, and the calculated lie angle may be output as the characteristic information. For example, as illustrated in FIG. 18, when three areas L to N are provided on the sole surface in order from a heel side, when the proportion of the number of the while pixels detected in the area L, which is on a heel side (a shaft side) of the sole of the iron golf club, (the proportion to the number of all the detected white pixels) is the largest, the area L is identified as the position likely to be damaged, and a value obtained by subtracting a certain value from the lie angle of the iron golf club the image of which has been taken is output as a new lie angle. On the other hand, when the proportion of the number of the while pixels detected in the area N, which is on a toe side (a counter-shaft side) of the sole of the iron golf club, is the largest, the area N is identified as the position likely to be damaged, and a value obtained by adding a certain value to the lie angle of the iron golf club the image of which has been taken is output as a new lie angle. When the proportion of the number of the white pixels detected in the center area M of the sole of the iron golf club is the largest, the area M is identified as the position likely to be damaged, and the lie angle of the iron golf club the image of which has been taken is output as it is.

In the third embodiment, the information processor 30 outputs the information identifying the area of the face surface of the golf club at which balls often hit as the characteristic information. Alternatively, a golf club having the largest coefficient of restitution of the area at which balls often hit or a golf club having the largest expected value of the coefficient of restitution may be selected from the kinds of golf clubs, and information identifying the selected golf club may be output as the characteristic information.

In the third embodiment, identification of the position likely to be damaged of the face surface is performed by detection of the white pixels on the taken image. Alternatively, it may be performed by detection of the mark M attached at the time of image taking.

In the first to third embodiments, the present disclosure is applied to shoes, bats, or golf clubs. The present invention can also be applied to other sports equipment such as baseball gloves. When the present disclosure is applied to a baseball glove, the information processor 30 can be caused to identify a place at which the number of flaws is large of the baseball glove as the position likely to be damaged and to output information indicating the identified position as the characteristic information. Thus, the user or the provider refers to the characteristic information and can get to know a way of catching action of the user and a place at which strength is required of a glove to be given to the user.

In the first to third embodiments, the image of the sports equipment itself is used for identification of the position likely to be damaged of the sports equipment; an image of an installed tool installed, during use of the sports equipment, on the sports equipment may be used. For example, an insole, an outsole, or a bat is used with pressure-sensitive paper installed as the installed tool, and based on the difference between an image of the pressure-sensitive paper after use and an image (appearance data) of the pressure-sensitive paper before use, a position at which pressure has significantly acted may be identified as the position likely to be damaged.

In the first to third embodiments, the image taken by the camera 11 is used for identification of the position likely to be damaged of the sports equipment; an image captured from a scanner may be used.

In the first to third embodiments, the information processor 30 performs acquisition of the image of the sports equipment through wireless communication; acquisition of the image of the sports equipment may be performed through wired communication or reading from a storage medium.

In the first to third embodiments, the information processor 30 is provided separately from the smartphone 10. Alternatively, the smartphone 10 may be caused to have the function of the information processor 30 according to the present disclosure. That is to say, the function of the information processor 30 according to the present disclosure may be achieved by allowing the smartphone 10 to execute application programs.

The present disclosure is useful as a method for processing information, an information processor, and an information processing program to output characteristic information on at least either sports equipment or a method for using the sports equipment by a user.

What is claimed is:

1. A method for allowing an information processor to output characteristic information on at least either sports equipment or a method for using the sports equipment by a user, the method comprising:
    allowing the information processor to execute image acquisition processing acquiring an image of the sports equipment after use, of the sports equipment with a mark attached, or of an installed tool installed, during use of the sports equipment, on the sports equipment;
    allowing the information processor to execute position identification processing identifying a position likely to be damaged of the sports equipment by performing detection of a color change place, a shape change place, or the mark on the image acquired in the image acquisition processing; and
    allowing the information processor to execute information outputting processing selecting any of several kinds of the sports equipment and outputting information identifying the selected sports equipment as the characteristic information based on the position identified in the position identification processing.

2. The method for processing information of claim 1, wherein the sports equipment is a component of a shoe.

3. The method for processing information of claim 1, wherein the sports equipment is a batting tool.

4. The method for processing information of claim 3, wherein
    the information outputting processing selects any of several kinds of the sports equipment and outputs information identifying the selected sports equipment as the characteristic information based on the position identified in the position identification processing and coefficients of restitution at positions of the several kinds of the sports equipment.

5. An information processor outputting characteristic information on at least either sports equipment or a method for using the sports equipment by a user, the information processor comprising:
    an image acquisition unit acquiring an image of the sports equipment after use, of the sports equipment with a mark attached, or of an installed tool installed, during use of the sports equipment, on the sports equipment;
    a position identification unit identifying a position likely to be damaged of the sports equipment by performing detection of a color change place, a shape change place, or the mark on the image acquired by the image acquisition unit; and
    an information output unit selecting any of several kinds of the sports equipment and outputting information identifying the selected sports equipment as the characteristic information based on the position identified by the position identification unit.

6. A non-transitory computer readable medium storing a program allowing an information processor to output characteristic information on at least either sports equipment or a method for using the sports equipment by a user, the non-transitory computer readable medium allowing the information processor to execute:
    image acquisition processing acquiring an image of the sports equipment after use, of the sports equipment with a mark attached, or of an installed tool installed, during use of the sports equipment, on the sports equipment;
    position identification processing identifying a position likely to be damaged of the sports equipment by performing detection of a color change place, a shape change place, or the mark on the image acquired in the image acquisition processing; and
    information outputting processing selecting any of several kinds of the sports equipment and outputting information identifying the selected sports equipment as the characteristic information based on the position identified in the position identification processing.

* * * * *